(12) United States Patent
Edamatsu et al.

(10) Patent No.: US 8,173,982 B2
(45) Date of Patent: May 8, 2012

(54) NON-DEGENERATE POLARIZATION-ENTANGLED PHOTON PAIR GENERATION DEVICE AND NON-DEGENERATE POLARIZATION-ENTANGLED PHOTON PAIR GENERATION METHOD

(75) Inventors: Keiichi Edamatsu, Natori (JP); Ryosuke Shimizu, Sendai (JP); Shigehiro Nagano, Fujisawa (JP)

(73) Assignee: Japan Science and Technology Agency, Saitama (JP)

( * ) Notice: Subject to any disclaimer, the term of this patent is extended or adjusted under 35 U.S.C. 154(b) by 299 days.

(21) Appl. No.: 12/672,578

(22) PCT Filed: Dec. 10, 2008

(86) PCT No.: PCT/JP2008/072441
§ 371 (c)(1),
(2), (4) Date: Feb. 8, 2010

(87) PCT Pub. No.: WO2009/093391
PCT Pub. Date: Jul. 30, 2009

(65) Prior Publication Data
US 2011/0315901 A1    Dec. 29, 2011

(30) Foreign Application Priority Data

Jan. 25, 2008  (JP) .................. 2008-014938

(51) Int. Cl.
G02F 1/35  (2006.01)
G02F 1/39  (2006.01)
G01N 21/63  (2006.01)
(52) U.S. Cl. .............. 250/493.1; 356/317; 356/318; 356/417; 356/432; 356/484; 359/326; 257/21; 257/14; 257/9
(58) Field of Classification Search .......... 250/493.1; 356/317, 318, 417, 432, 484; 359/326; 257/21, 257/14, 9
See application file for complete search history.

(56) References Cited

U.S. PATENT DOCUMENTS
7,408,637 B2 *  8/2008  Freeling et al. .............. 356/317
(Continued)

FOREIGN PATENT DOCUMENTS
JP    2007-114464    5/2007

OTHER PUBLICATIONS
International Search Report for corresponding Application No. PCT/JP2008/072441 mailed Mar. 3, 2009.
(Continued)

*Primary Examiner* — Nikita Wells
(74) *Attorney, Agent, or Firm* — Renner, Otto, Boisselle & Sklar, LLP

(57) ABSTRACT

A non-degenerate polarization-entangled photon pair generation device (1) that efficiently and easily generates non-degenerate polarization-entangled photon pairs includes: a quantum-entangled photon pair generator (2) including a single crystal in which periodically poled structures (3a, 3b) having different periods are formed; and a light radiating unit (4) for entering light into the quantum-entangled photon pair generator (2) such that the light passes through the periodically poled structure (3a) and then through the periodically poled structure (3b). A period of the periodically poled structure (3a) is different from a period of the periodically poled structure (3b) such that a parabola indicative of a relation between an emission angle and a wavelength of a polarized photon emitted based on light incident on the periodically poled structure (3a) comes into contact with a parabola indicative of a relation between an emission angle and a wavelength of polarized photon emitted based on light incident on the periodically poled structure (3b), within an allowable range under a phase matching condition.

6 Claims, 4 Drawing Sheets

U.S. PATENT DOCUMENTS

| | | | |
|---|---|---|---|
| 7,570,419 B2 * | 8/2009 | Edamatsu et al. | 359/326 |
| 7,609,382 B2 * | 10/2009 | Kastella et al. | 356/433 |
| 7,683,361 B2 * | 3/2010 | Edamatsu et al. | 257/13 |
| 7,831,048 B2 * | 11/2010 | Kastella et al. | 380/256 |
| 2007/0216991 A1 | 9/2007 | Edamatsu et al. | |

OTHER PUBLICATIONS

Form PCT/ISA/237.

Pelton et al., "Bright, single-spatial-mode source of frequency non-degenerate polarization-entangled photon pairs using periodically poled KTP", Optics Express, 2004, vol. 12, No. 15, p. 3573-3580.

Kintaka et al., "Fabrication and Preliminary Experiments of Type II Quasi-Phase Matched $LiNbO_3$ Waveguide Twin Photon Generation Device", Extended Abstracts (The 51th Spring Meeting, 2004), The Japan Society of Applied Physics and Related Societies, p. 1303, 29p-ZC-14 and partial English translation.

Kwiat et al., "New High-Intensity Source of Polarization-Entangled Photon Pairs", Physical Review Letters, 1995, vol. 75, p. 4337-4341.

Takesue et al., "Generation of polarization-entangled photon pairs and violation of Bell's inequality using spontaneous four-wave mixing in a fiber loop", Physical Review, 2004, A 70, 031802 (R), p. 70, 031802-1-031802-4.

\* cited by examiner

NON-DEGENERATE POLARIZATION-ENTANGLED PHOTON PAIR GENERATION DEVICE AND NON-DEGENERATE POLARIZATION-ENTANGLED PHOTON PAIR GENERATION METHOD

TECHNICAL FIELD

The present invention relates to a non-degenerate polarization-entangled photon pair generation device and a non-degenerate polarization-entangled photon pair generation method each for generating photon pairs in a non-degenerate polarization-entangled state.

BACKGROUND ART

In recent years, information communication techniques more widely have been implemented in the form of, for example, electronic commerce and electronic mails. To cope with this, cryptographic techniques in information transmission have been also researched and developed. As one of the cryptographic techniques, quantum cryptography is highly expected recently.

In the quantum cryptography, security is ensured by utilizing a physical phenomenon according to Heisenberg's uncertainty principle in quantum mechanics. According to the uncertainty principle, a quantum state is changed by observation, and therefore, eavesdropping (observation) of a communication cannot be performed without being surely detected. This allows taking measures against the eavesdropping, such as blocking the communication. This makes eavesdropping physically impossible in the quantum cryptography. Further, according to the uncertainty principle, replication of particles is also impossible in the quantum cryptography.

Quantum teleportation is an important feature in the quantum cryptography. The quantum teleportation is a technique for transmitting only quantum information of the particles to another place. The quantum teleportation is realized by exchanging information between photons by utilizing a quantum-entangled state. A photon pair in the quantum-entangled state has such a property that a quantum state of one of the photons is determined when a quantum state of the other one of the photons is determined. This property is not dependent on a distance between the two photons.

In the quantum teleportation technique, such photon pairs in the quantum-entangled state are essential.

The following describes a two-photon polarization-entangled state. It is known that a quantum-entangled state of 2 quantum bits (two photons) using polarized light takes the following 4 states.

Math. 1

$$|\Psi^{\pm}\rangle_{12} \equiv \frac{1}{\sqrt{2}}(|H\rangle_1|V\rangle_2 \pm |V\rangle_1|H\rangle_2) \quad (1)$$

$$|\Phi^{\pm}\rangle_{12} \equiv \frac{1}{\sqrt{2}}(|H\rangle_1|H\rangle_2 \pm |V\rangle_1|V\rangle_2) \quad (2)$$

A light path of the photon and an angular frequency of the photon are some of physical quantities to determine a mode i of a photon.

The following describes a method (parametric down-conversion) for producing two photons. As a physical process to produce a two-photon state, a parametric down-conversion process is often used. In the parametric down-conversion process, a single pump photon (angular frequency $\omega_p$, wave vector $k_p$) incident on a crystal is converted into a photon pair with a certain probability. One of the photon pair is a signal photon (angular frequency $\omega_s$, wave vector $k_s$) and, the other one of the photon pair is an idler photon (angular frequency $\omega_i$, wave vector $k_i$). At this time, in order that the parametric down-conversion process may be caused, the following phase matching condition should be satisfied.

Math. 2

$$\omega_p = \omega_s + \omega_i \quad (3)$$

$$k_p = k_s + k_i \quad (4)$$

There are 3 types of the phase matching conditions depending on polarization of the photons.

1. Type-O Phase Matching Condition
This is a case where the pump photon, the signal photon, and the idler photon have the same polarization.
2. Type-I Phase Matching Condition
This is a case where the signal photon and the idler photon have the same polarization, and the polarization of the pump photon is perpendicular to the polarization of the signal photon and the idler photon.
3. Type-II Phase Matching Condition
This is a case where the polarization of the signal photon is perpendicular to the polarization of the idler photon, and the pump photon has the same polarization as either of the polarization of the signal photon and the polarization of the idler photon.

Next will be explained a quasi phase matching method. The quasi phase matching method is well known as a technique for satisfying the phase matching condition at a certain wavelength. In the quasi phase matching method, a second order nonlinear optical susceptibility is periodically modulated so as to satisfy the phase matching condition. In this case, the above expression (4) of the phase matching condition is changed to the following expression (5):

Math. 3

$$k_p = k_s + k_i + \frac{2\pi}{\Lambda} \quad (5)$$

where $\Lambda$ is a modulation period of the second order nonlinear optical susceptibility. A "periodic polarization reversal method" in which spontaneous polarization of a crystal is periodically reversed is put into practice as a technique for periodically modulating the second order nonlinear optical susceptibility.

The following describes a conventional method for producing a polarization-entangled state. There have been reported several techniques as the method for producing a polarization-entangled state in which two photons have the same angular frequency (for example, see Non Patent Literature 1). In this method, since the two photons have the same angular frequency and therefore it is difficult to distinguish them from each other, a mode is determined according to a light path of the photon. That is, the two photons should be emitted in different light paths.

Further, there has been also suggested a method for producing a polarization-entangled state in which two photons have different angular frequencies. In this method, since the photons are distinguished from each other according to the angular frequencies, the two photons may be emitted in the same light path.

As the method for producing a polarization-entangled photon pair constituted by two photons having different angular frequencies, there have been reported the following methods.

1. A Method Utilizing a Parametric Down-Conversion of Type-O or Type-I (Non Patent Literature 2)

This method utilizes nonlinear optical crystals that satisfy the phase matching conditions type-O or type-I so as to generate two photons having the same polarization state. The nonlinear optical crystals are aligned in series by being rotated in opposite directions by 90 degrees. In this case, the two crystals are irradiated by light from the same pump light source, so as to generate two photons ($\omega_1$, $\omega_2$) having different angular frequencies in a coaxial direction of pump light.

2. A Method for Producing Two Types of Periodically Poled Structures in a Single Crystal (Patent Literature 2)

This method employs different phase matching conditions type-O and type-I.

3. A Method Utilizing a Four-Wave Mixing Process that is a Third Nonlinear Optical Phenomenon Caused in Optical Fibers (Non Patent Literature 3)

In this method, optical fibers are set in an interferometer and a polarization-entangled state is generated.

Further, a method in which non-degenerate polarization-entangled photon pairs are produced by utilizing a two-photon resonance excitation process in a semiconductor has been also known (Patent Literature 1).

Citation List

Patent Literature 1

Japanese Patent Application Publication, Tokukai, No. 2005-309012 A (Publication Date: Nov. 4, 2005)

Patent Literature 2

Japanese Patent Application Publication, Tokukai, No. 2007-114464 A (Publication Date: May 10, 2007)

Non Patent Literature 1

"New high-intensity source of polarization-entangled photon pairs." P. G. Kwiat et al., Phys. Rev. Lett. 75, 4337 (1995).

Non Patent Literature 2

"Bright, single-spatial-mode source of frequency non-degenerate, polarization-entangled photon pairs using periodically poled KTP." M. Pelton et al., Opt. Express 12, 3573 (2004).

Non Patent Literature 3

"Generation of polarization-entangled photon pairs and violation of Bell's inequality using spontaneous four-wave mixing in a fiber loop," H. Takesue and Kyo Inoue, Phys. Rev. A 70, 031802 (2004).

SUMMARY OF INVENTION

However, the method disclosed in Non Patent Literature 2 is complicated because it is necessary to prepare two crystals having the same property and to align them precisely.

The method disclosed in Patent Literature 2 employs the different phase matching conditions type-0 and type I, which causes a problem that it is difficult to take a balance in generation efficiency between two photons generated from respective periodically poled structures of the type-0 and type-I phase matching conditions. The imbalance in the generation efficiency between two photons generated from the respective periodically poled structures decreases a degree of quantum entanglement.

In the method disclosed in Non Patent Literature 3, it is necessary to set optical fibers in an interferometer for the generation of the polarization-entangled state. This makes a configuration of a device more complicated.

Further, the method disclosed in Patent Literature 1 uses a resonant level in a semiconductor, and therefore is limited as to an angular frequency of pump light to be incident. As a result, a frequency band of generated non-degenerate polarization-entangled photon pairs is also limited to a narrow range.

The present invention is accomplished in view of the above problems. An object of the present invention is to realize a non-degenerate polarization-entangled photon pair generation device which can easily generate non-degenerate polarization-entangled photon pairs and which can improve efficiency of generating the non-degenerate polarization-entangled photon pairs.

In order to achieve the above object, a non-degenerate polarization-entangled photon pair generation device of the present invention includes: a quantum-entangled photon pair generator including a single crystal in which a first periodically poled structure having a first period and a second periodically poled structure having a second period that is different from the first period are formed; and light radiating means for entering light into the single crystal such that the light passes through the first periodically poled structure and then through the second periodically poled structure.

With the configuration, it is possible to form, in a single crystal, a first periodically poled structure and a second periodically poled structure, each for generating non-degenerate polarization-entangled photon pairs. This makes it possible to easily generate the non-degenerate polarization-entangled photon pairs and to increase generation efficiency of the non-degenerate polarization-entangled photon pairs.

In addition, since the present invention does not utilize a resonant level in a substance, a limitation on an angular frequency of pump light to be incident on the single crystal is moderate. As a result, it is possible to generate non-degenerate polarization-entangled photon pairs in a large bandwidth.

In the non-degenerate polarization-entangled photon pair generation device of the present invention, it is preferable that the first period of the first periodically poled structure be different from the second period of the second periodically poled structure such that a parabola indicative of a relation between an emission angle and a wavelength of a polarized photon emitted based on light incident on the first periodically poled structure comes into contact with a parabola indicative of a relation between an emission angle and a wavelength of polarized photon emitted based on light incident on the second periodically poled structure, within an allowable range under a phase matching condition.

With the above configuration, it is possible to adjust poling periods to a type-II phase matching condition that generates such a pair of photons that one of the photons has an angular frequency ω1 and the other one of the photons has an angular frequency ω2 in a coaxial direction of a traveling direction of the pump light and polarization of the one of the photons is perpendicular to polarization of the other one of the photons.

In the non-degenerate polarization-entangled photon pair generation device of the present invention, it is possible to use a lithium niobate crystal as the single crystal.

With the above configuration, it is possible to easily form the first periodically poled structure and the second periodically poled structure each for generating non-degenerate polarization-entangled photon pairs.

It is preferable that the non-degenerate polarization-entangled photon pair generation device of the present invention further include a third periodically poled structure that produces pump light, and the light radiating means enter light into the third periodically poled structure such that the light passes through the third periodically poled structure, the first periodically poled structure, and the second periodically poled structure, in this order.

In the above configuration, the light emitted from the light radiating means enters the third periodically poled structure so that the light is converted into pump light. The pump light then enters the first and second periodically poled structures so that non-degenerate polarization-entangled photon pairs are generated.

In the non-degenerate polarization-entangled photon pair generation device of the present invention, it is preferable that the third periodically poled structure be formed in the single crystal.

In the above configuration, it is not necessary to prepare another crystal to generate pump light. Accordingly, a simple configuration for generating non-degenerate polarization-entangled photon pairs can be obtained.

In order to achieve the above object, a method of the present invention for generating non-degenerate polarization-entangled photon pairs includes the step of entering light into a single crystal in which a first periodically poled structure having a first period and a second periodically poled structure having a second period different from the first period are formed, in such a manner that the light passes through the first periodically poled structure and then through the second periodically poled structure.

With the above configuration, it is possible to form a first periodically poled structure and a second periodically poled structure, each for generating non-degenerate polarization-entangled photon pairs, in a single crystal. This makes it possible to easily generate the non-degenerate polarization-entangled photon pairs and to increase generation efficiency of the non-degenerate polarization-entangled photon pairs.

As described above, the non-degenerate polarization-entangled photon pair generation device of the present invention includes a quantum-entangled photon pair generator including a single crystal in which first and second periodically poled structures having different periods are formed. This attains advantageous effects that non-degenerate polarization-entangled photon pairs can be easily generated and generation efficiency of the non-degenerate polarization-entangled photon pairs can be increased.

REFERENCE SIGNS LIST

1 Non-Degenerate Polarization-Entangled Photon Pair Generation Device
2 Quantum-Entangled Photon Pair Generator
3a Periodic Poling Structure (First Periodically Poled Structure)
3b Periodic Poling Structure (Second Periodically Poled Structure)
3c Periodic Poling Structure (Third Periodically Poled Structure)
4 Light Radiating Unit (Light Radiating Means)

DESCRIPTION OF EMBODIMENTS

One embodiment of the present invention is explained below with reference to FIG. 1 through FIG. 7.

In the present embodiment, periodically poled structures different from each other are formed in a single crystal under a type-II phase matching condition that generates two photons whose polarization is orthogonal to each other. In this case, a poling period of one of the periodically poled structures is adjusted such that a photon having an angular frequency $\omega_1$ has first polarization and a photon having an angular frequency $\omega_2$ has second polarization. Further, a poling period of the other one of the periodically poled structures is adjusted such that a photon having an angular frequency $\omega_1$ has second polarization and a photon having an angular frequency $\omega_2$ has first polarization. With these structures, a polarization-entangled state at non-degenerate wavelengths is generated from a single crystal, by utilizing a frequency mode. The present invention uses the type-II phase matching condition for either of the periodically poled structures, thereby making it easy to take a balance of two-photon generation efficiency between the periodically poled structures. Further, this configuration does not require an additional interferometer, thereby successfully providing a very simple device configuration.

Figure 1:
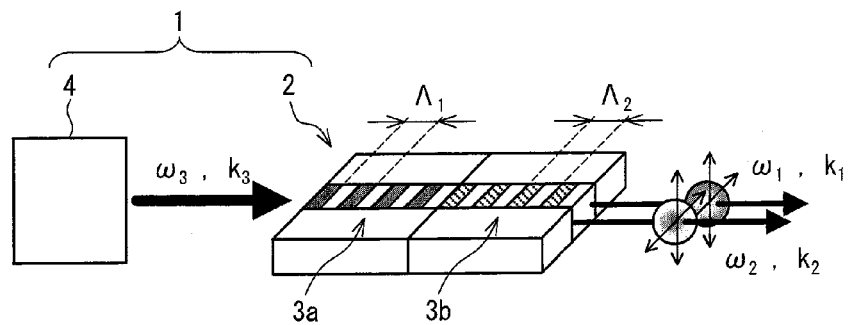
FIG. 1 is a view schematically illustrating a configuration of a non-degenerate polarization-entangled photon pair generation device according to one embodiment.

FIG. 1 is a view schematically illustrating a configuration of a non-degenerate polarization-entangled photon pair generation device 1 according to the present invention. The non-degenerate polarization-entangled photon pair generation device 1 includes a quantum-entangled photon pair generator 2. The quantum-entangled photon pair generator 2 is constituted by a single crystal in which periodically poled structures 3a and 3b having different periods are formed. The single crystal is made of a lithium niobate crystal. The non-degenerate polarization-entangled photon pair generation device 1 also includes an incidence unit 4 that causes light to enter the photon pair generator 2 (single crystal) in such a manner that the light passes through the periodically poled structure 3a and then through the periodically poled structure 3b.

In the present embodiment, the periodically poled structures 3a and 3b having different periods are formed in the single crystal (the photon pair generator 2) (FIG. 1). Poling periods are adjusted to satisfy the type-II phase matching condition. Under the type-II phase matching condition, such a pair of photons is generated, with respect to incoming pump light of an angular frequency $\omega_3$ and a wave number vector $k_3$, in a coaxial direction of a traveling direction of the incoming pump light that one of the photons has an angular frequency $\omega_1$ (wave number vector $k_1$) and the other one of the photons has an angular frequency $\omega_2$ (wave number vector $k_2$), and polarization of the one of the photons is perpendicular to that of the other one of the photons. In quasi phase matching employing such periodically poled structures, the angular frequencies and the wave number vectors in the light are respectively represented by the following relational expressions.

Math. 4

$$\omega_3 = \omega_1 + \omega_2 \quad (6)$$

$$k_3 = k_1 + k_2 + \frac{2\pi}{\Lambda_i} \quad (7)$$

In the expression (7), $\Lambda_i$ indicates a poling period. In this case, a poling period $\Lambda_1$ is adjusted so that the first periodically poled structure $3a$ generates a photon pair such that a photon having an angular frequency $\omega_1$ has first polarization and a photon having an angular frequency $\omega_2$ has second polarization. In the first periodically poled structure $3a$, a spontaneous polarization region that the crystal originally has and a spontaneous-polarization-reversed region where the spontaneous polarization is reversed are provided in an alternate manner along a traveling direction of the photons. The poling period $\Lambda_1$ indicates a period in which one cycle is a set of the spontaneous polarization region and the spontaneous-polarization-reversed region. Further, a poling period $\Lambda_2$ is adjusted so that the second periodically poled structure $3b$ generates a photon pair such that a photon having an angular frequency $\omega_1$ has second polarization and a photon having an angular frequency $\omega_2$ has first polarization. In the second periodically poled structure $3b$, a spontaneous polarization region that the crystal originally has and a spontaneous-polarization-reversed region where the spontaneous polarization is reversed are provided in an alternate manner along a traveling direction of the photons. The poling period $\Lambda_2$ indicates a period in which one cycle is a set of the spontaneous polarization region and the spontaneous-polarization-reversed region.

In a case where single pump light is supplied to a quasi phase matching element configured as such, a generated two-photon state forms a state represented by the following expression:

Math. 7

$$|\psi\rangle = \frac{1}{\sqrt{2}}(|H\rangle_{\omega 1}|V\rangle_{\omega 2} + e^{i\phi}|V\rangle_{\omega 1}|H\rangle_{\omega 2}) \quad (8)$$

The two-photon state represented by the above expression is a linear superposition of states of (i) a two-photon state produced by the periodically poled structure $3a$, represented by the following expression:
Math. 5

$$|H\rangle_{\omega 1}|V\rangle_{\omega 2}$$

and (ii) a two-photon state produced by the periodically poled structure $3b$ represented by the following expression:
Math. 6

$$|V\rangle_{\omega 1}|H\rangle_{\omega 2}$$

In the expression (8), $\phi$ is a phase different between the two-photon states respectively generated from the two periodically poled structures $3a$ and $3b$. The state represented by the expression (8) is a polarization-entangled state utilizing a frequency mode.

Figure 2:
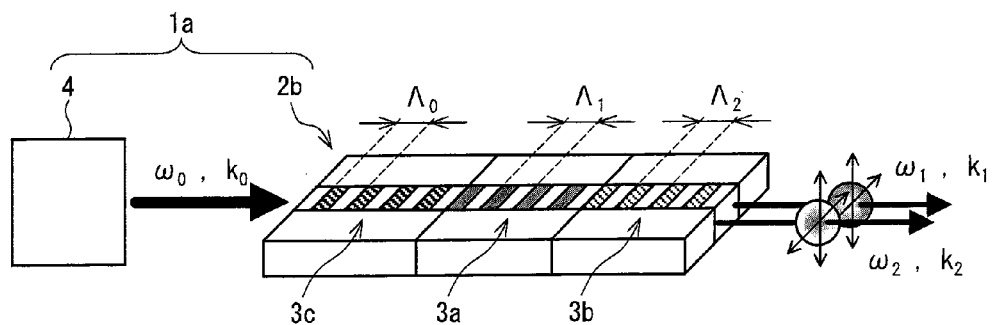
FIG. 2 is a view schematically illustrating a configuration of another non-degenerate polarization-entangled photon pair generation device according to one embodiment.

FIG. 2 is a view schematically illustrating another non-degenerate polarization-entangled photon pair generation device $1a$ according to the present embodiment. The non-degenerate polarization-entangled photon pair generation device $1a$ carries out second harmonic generation with the use of quasi phase matching by a periodically poled structure so that pump light having an angular frequency $\omega_3$ is generated. That is, a periodically poled structure $3c$ that satisfies the following expressions is formed as a zeroth period (FIG. 2).

Math. 8

$$\omega_3 = 2\omega_0 \quad (9)$$

$$k_3 = 2k_0 + \frac{2\pi}{\Lambda_0} \quad (10)$$

where $\omega_0$ is an angular frequency of a fundamental wave in the second harmonic generation and $k_0$ is a wave number vector of the fundamental wave. This structure allows a single crystal to generate polarization-entangled state of two photons respectively having an angular frequency $\omega_1$ and an angular frequency $\omega_2$, from incident light having the angular frequency $\omega_0$.

In the periodically poled structure $3c$, a spontaneous polarization region and a spontaneous-polarization-reversed region where the spontaneous polarization is reversed are provided in an alternate manner along a traveling direction of the photons. A poling period $\Lambda_0$ indicates a period in which one cycle is a set of the spontaneous polarization region and the spontaneous-polarization-reversed region.

The conventional technique requires two crystals or alternatively has to use an interferometer. In contrast, the method according to the present embodiment does not require the interferometer. As a result, the method according to the present embodiment has an advantage that non-degenerate polarization-entangled photon pairs can be easily generated just by a single crystal. Further, in order to carry out the second harmonic generation to obtain pump light for some frequency bands of two photons to be generated, the conventional technique requires another crystal. However, in the present embodiment, the second harmonic generation to obtain the pump light and the parametric down-conversion to generate the two-photon state can be carried out by use of a single crystal.

Figure 3:
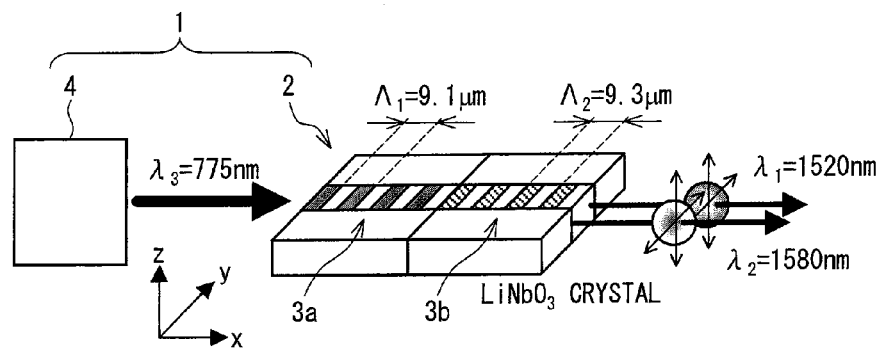
FIG. 3 is a view schematically illustrating an example of the non-degenerate polarization-entangled photon pair generation device.

FIG. 3 is a view schematically illustrating an example of the non-degenerate polarization-entangled photon pair generation device 1. In the example, a lithium niobate crystal ($LiNbO_3$) is used as a crystal in which the periodically poled structures $3a$ and $3b$ are formed. Initially, a structure (period $\Lambda_1$=9.1 µm) is formed as the first periodically poled structure $3a$ for generating two non-degenerate photons having different wavelengths. Pump light having a wavelength of 775 nm and being polarized in a y-axial direction is incident on the first periodically poled structure along an x axis of the crystal (FIG. 3).

Figure 4:
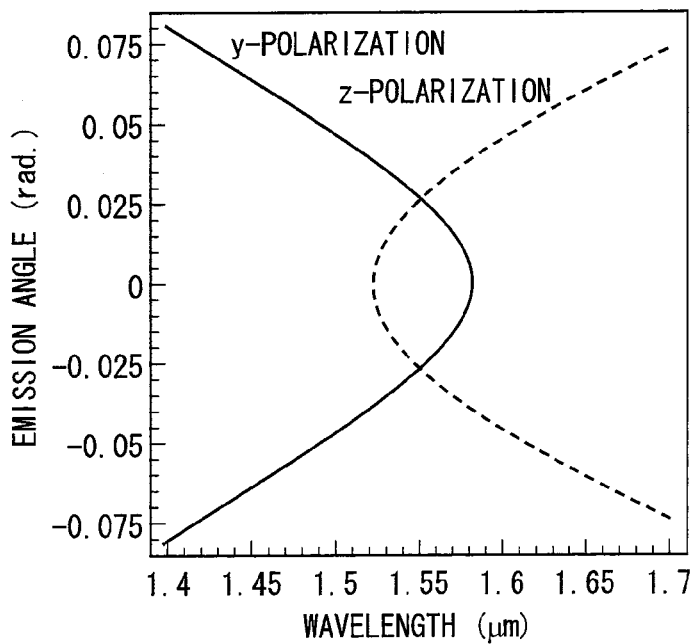
FIG. 4 is a graph showing a relation between an emission angle and a wavelength of a polarized photon emitted based on light incident on a first periodically poled structure provided in the non-degenerate polarization-entangled photon pair generation device.

At this time, the first periodically poled structure emits a photon polarized in the y-axial direction and a photon polarized in a z-axial direction. FIG. 4 is a graph showing a relation between an emission angle and a wavelength in each of the photons. The graph is obtained by simulation.

The graph demonstrates that the photon polarized in the y-axial direction and having a wavelength of 1580 nm, and the photon polarized in the z-axial direction and having a wavelength of 1520 nm are generated in a coaxial direction (0 rad.) of the pump light.

Figure 5:
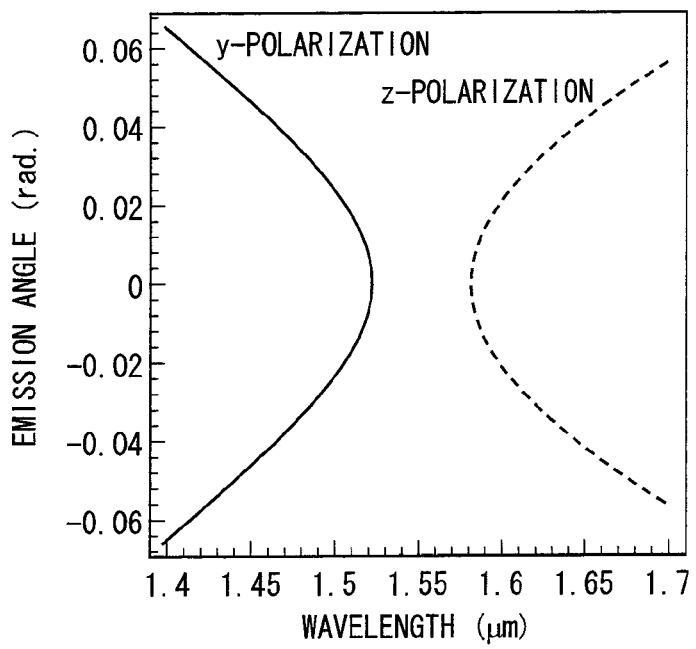
FIG. 5 is a graph showing a relation between an emission angle and a wavelength of a polarized photon emitted based on light incident on a second periodically poled structure provided in the non-degenerate polarization-entangled photon pair generation device.

Then, a structure (period $\Lambda_1 = 9.3$ μm) is formed as a second period. The same pump light as the one used in the first period structure is incident on the structure as the second period. At this time, the structure generates a photon polarized in the y-axial direction and a photon polarized in the z-axial direction. FIG. 5 is a graph showing a relation between an emission angle and a wavelength in each of the photons. The graph is obtained by simulation. The graph demonstrates that the photon polarized in the z-axial direction and having a wavelength of 1580 nm and the photon polarized in the y-axial direction and having a wavelength of 1520 nm are generated in a coaxial direction (0 rad.) of the pump light.

Figure 6:
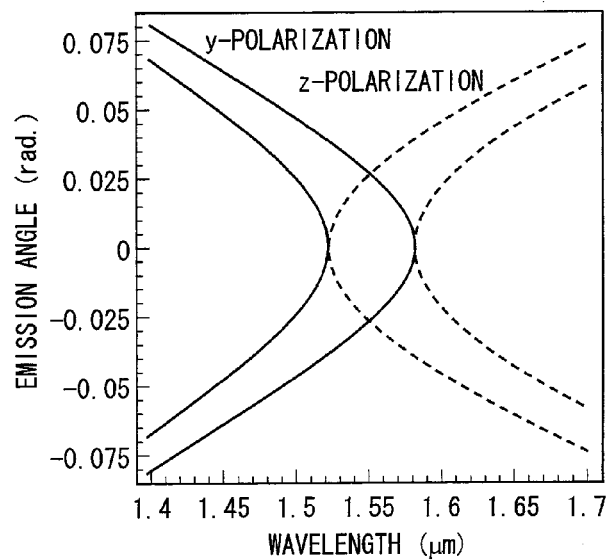
FIG. 6 shows the graph in FIG. 4 and the graph in FIG. 5 together in such a manner that the graphs in FIG. 4 and FIG. 5 are overlapped with each other.

FIG. 6 shows the graph in FIG. 4 and the graph in FIG. 5 together in such a manner that the graphs in FIG. 4 and FIG. 5 are overlapped with each other. The graph of FIG. 6 demonstrates that, within an allowable range under the phase matching condition, (i) a parabola indicating the photon polarized in the y-axial direction in FIG. 4 has contact with a parabola indicating the photon polarized in the z-axial direction in FIG. 5 at the wavelength of 1580 nm and (ii) a parabola indicating the photon polarized in the z-axial direction in FIG. 4 has contact with a parabola indicating the photon polarized in the y-axial direction in FIG. 5 at the wavelength of 1520 nm. That is, it is demonstrated that polarization of photons indicated by parabolas having contact with each other is perpendicular to each other. That is, in a case where the two periodically poled structures 3a and 3b are formed in a single crystal and the pump light polarized in the y-axial direction and having the wavelength of 775 nm is incident on the single crystal, the first periodically poled structure 3a emits two photons of a photon having a wavelength of 1580 nm and being polarized in the y-axial direction and a photon having a wavelength of 1520 nm and being polarized in the z-axial direction, which two photons are represented as follows:
Math. 9

$|y\rangle_{1580} |z\rangle_{1520}$

On the other hand, the second periodically poled structure 3b emits two photons of a photon having a wavelength of 1580 nm and being polarized in the z-axial direction and a photon having a wavelength of 1520 nm and being polarized in the y-axial direction, which two photons are represented as follows:
Math. 10

$|z\rangle_{1580} |y\rangle_{1520}$

Since the same pump light is incident on either of the structures, a two-photon state to be emitted is a state where the above states are linearly combined as represented as follows:

Math. 11

$$|\psi\rangle = \frac{1}{\sqrt{2}}(|y\rangle_{1580} |z\rangle_{1520} + e^{i\varphi} |z\rangle_{1580} |y\rangle_{1520}) \quad (11)$$

As such, it is demonstrated that a non-degenerate polarization-entangled state using the same frequency mode as in the expression (1) is generated where the polarization in the y-axial direction is regarded as first polarization and the polarization in the z-axial direction is regarded as second polarization.

Figure 7:
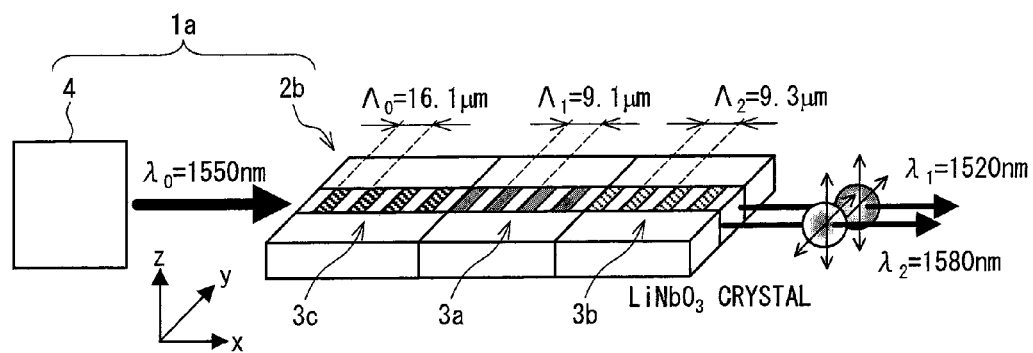
FIG. 7 is a view schematically illustrating an example of the another non-degenerate polarization-entangled photon pair generation device.

FIG. 7 is a view schematically illustrating an example of the non-degenerate polarization-entangled photon pair generation device 1a. In the non-degenerate polarization-entangled photon pair generation device 1a, further another poling structure ($\Lambda_0 = 16.1$ μm) is formed as a zeroth periodically poled structure 3c in front of the periodically poled structures 3a and 3b (along a traveling direction of light). This makes it possible to obtain pump light having a wavelength of 775 nm and being polarized in a y-axis direction, with respect to incident light having a wavelength of 1550 nm and being polarized in the y-axial direction. As such, by adding the structure (the periodically poled structure 3c), it is possible to obtain a polarization-entangled photon pair of two photons from incident light having the wavelength of 1550 nm that is a center of wavelengths of the two photons.

A polarization-entangled state obtained by the configuration of FIG. 3 is not limited only to the wavelengths of 1580 nm and 1520 nm. By adjusting the poling period, it is possible to obtain various polarization-entangled states of a variety of two wavelengths. For example, in a case where periodically poled structures of $\Lambda_1 = 3.9$ μm and $\Lambda_2 = 4.9$ μm are formed and pump light polarized in a y-axis direction and having a wavelength of 532 nm is incident on the periodically poled structures along an x axis of a crystal, it is possible to obtain the following polarization-entangled state of wavelengths of 810 nm and 1550 nm.

Math. 12

$$|\psi\rangle = \frac{1}{\sqrt{2}}(|y\rangle_{810} |z\rangle_{1550} + e^{i\varphi} |z\rangle_{810} |y\rangle_{1550}) \quad (12)$$

Further, the polarization-entangled state obtained by the configuration of FIG. 3 is not limited to a case where the lithium niobate crystal is used. For example, it is also possible to obtain the non-degenerate polarization-entangled state by use of a KTP crystal (KTiOPO$_4$) in which such periodically poled structures can be produced. More specifically, a non-degenerate polarization-entangled state having wavelengths of 1580 nm and 1520 nm, which is the same as the one represented by the expression (9), can be obtained by forming periodically poled structures having a period $\Lambda_1$ of 49.8 μm and a period $\Lambda_2$ of 44.8 μm in the KTP crystal (KTiOPO$_4$).

Further, as typical crystals, except for the lithium niobate (LiNbO$_3$) crystal, in which polarization can be reversed periodically, there have been known a lithium tantalate (LiTaO$_3$) crystal and a potassium titanyl phosphate (KTiOPO$_4$). Potassium niobate (KNbO$_3$) is also a crystal in which polarization can be reversed.

Figure 8:
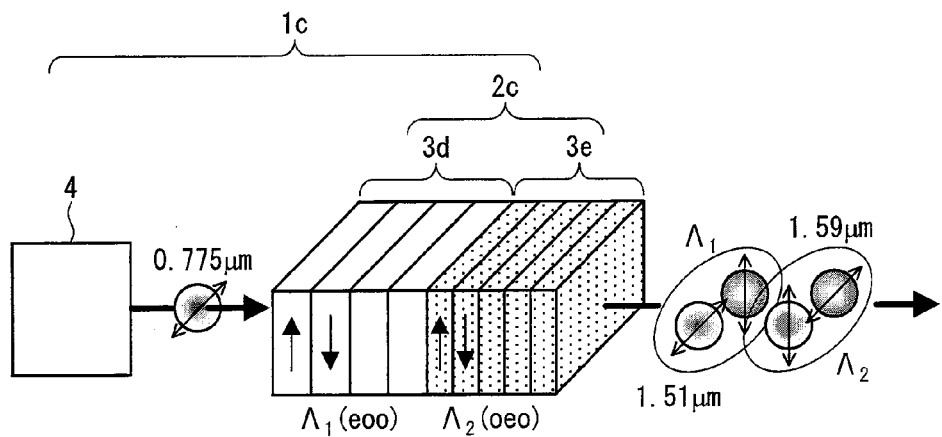
FIG. 8 is a view schematically illustrating an example of the non-degenerate polarization-entangled photon pair generation device.

FIG. 8 is a view schematically illustrating another example of the non-degenerate polarization-entangled photon pair generation device 1, and briefly illustrates a PPLN crystal having two different periodically poled structures. Several techniques for generating non-degenerate polarization-entangled photon pairs by use of a parametric down-conversion (PDC) process have been reported. In these techniques, since a pair of photons having different wavelengths can be obtained, it is possible to easily and efficiently split the pair of photons by use of a mirror according to the wavelengths. In addition, by arranging such that one of the pair of photons has a wavelength of a communication band, it is possible to transmit information farther. Moreover, the other one of the pair of photons can be at a near side so that its wavelength can be manipulated. In the present example, a type-II quasi phase matching element having different periods was structured in a single LiNbO₃ (LN) crystal, and a spectrum of parametric fluorescence having two peak wavelengths in the communication band was observed.

A non-degenerate polarization-entangled photon pair generation device 1c includes a quantum-entangled photon pair generator 2c. The quantum-entangled photon pair generator 2c is constituted by a single crystal in which a periodically poled structure 3d having a period $\Lambda_1$ of 9.25 (interaction length: 20 mm) and a periodically poled structure 3e having a period $\Lambda_2$ of 9.50 μm (interaction length: 20 mm). The single crystal is made of a lithium niobate crystal. The non-degenerate polarization-entangled photon pair generation device 1c also includes an incidence unit 4 that causes light to enter the photon pair generator 2c (single crystal) in such a manner that the light passes through the periodically poled structure 3d and then through the periodically poled structure 3e.

The quantum-entangled photon pair generator 2c is structured so as to generate (a) a photon pair of an e-ray (1.59 μm band) and an o-ray (1.51 μm band) from a region of the period $\Lambda_1$ and (b) a photon pair of an e-ray (1.51 μm band) and an o-ray (1.59 μm band) from a region of the period $\Lambda_2$, each along a coaxial direction of pump light having a wavelength of 775 nm at a crystallization temperature of 119.5° C.

Figure 9:
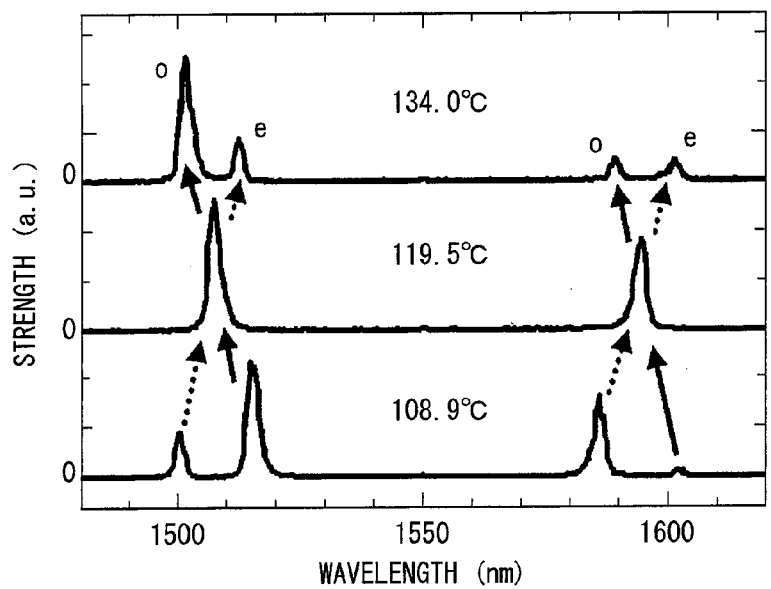
FIG. 9 is a graph showing a temperature dependency of a parametric fluorescence spectrum in the example.

FIG. 9 is a graph showing a temperature dependency of a parametric fluorescence spectrum in the example. At a crystallization temperature of 108.9° C., a parametric fluorescence spectrum has 4 peaks of different polarization generated through a region of $\Lambda_1$ and a region of $\Lambda_2$. At a crystallization temperature of 119.5° C., the peaks are overlapped with each other such that the parametric fluorescence spectrum forms 2 peaks at 1.51 μm band and at 1.59 μm band (degenerate). Further, when the crystallization temperature is increased to 134.0° C., the degenerate 2 peaks are split into 4 peaks again. By splitting light having two wavelengths at the crystallization temperature 119.5° C. by use of a dichroic mirror, it is possible to generate a non-degenerate polarization-entangled photon pair that is not necessary to be selected afterward.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

The present invention is applicable to a non-degenerate polarization-entangled photon pair generation device and a non-degenerate polarization-entangled photon pair each of which generate photon pairs in a non-degenerate

The invention claimed is:

1. A non-degenerate polarization-entangled photon pair generation device comprising:
   a quantum-entangled photon pair generator including a single crystal in which a first periodically poled structure having a first period and a second periodically poled structure having a second period that is different from the first period are formed; and
   light radiating means for entering light into the single crystal such that the light passes through the first periodically poled structure and then through the second periodically poled structure.

2. The non-degenerate polarization-entangled photon pair generation device as set forth in claim 1, wherein:
   the first period of the first periodically poled structure is different from the second period of the second periodically poled structure such that a parabola indicative of a relation between an emission angle and a wavelength of a polarized photon emitted based on light incident on the first periodically poled structure comes into contact with a parabola indicative of a relation between an emission angle and a wavelength of polarized photon emitted based on light incident on the second periodically poled structure, within an allowable range under a phase matching condition.

3. The non-degenerate polarization-entangled photon pair generation device as set forth in claim 1, wherein:
   the single crystal is a lithium niobate crystal.

4. The non-degenerate polarization-entangled photon pair generation device as set forth in claim 1, further comprising:
   a third periodically poled structure that produces pump light,
   the light radiating means entering the light into the third periodically poled structure such that the light passes through the third periodically poled structure, the first periodically poled structure, and the second periodically poled structure, in this order.

5. The non-degenerate polarization-entangled photon pair generation device as set forth in claim 4, wherein:
   the third periodically poled structure is formed in the single crystal.

6. A non-degenerate polarization-entangled photon pair generation method comprising the step of:
   entering light into a single crystal in which a first periodically poled structure having a first period and a second periodically poled structure having a second period different from the first period are formed, in such a manner that the light passes through the first periodically poled structure and then through the second periodically poled structure.

* * * * *